July 11, 1967 — L. P. ROSELL — 3,330,313
SUPPLY AND RECEIVER COUPLER
Filed Feb. 25, 1965 — 2 Sheets-Sheet 1
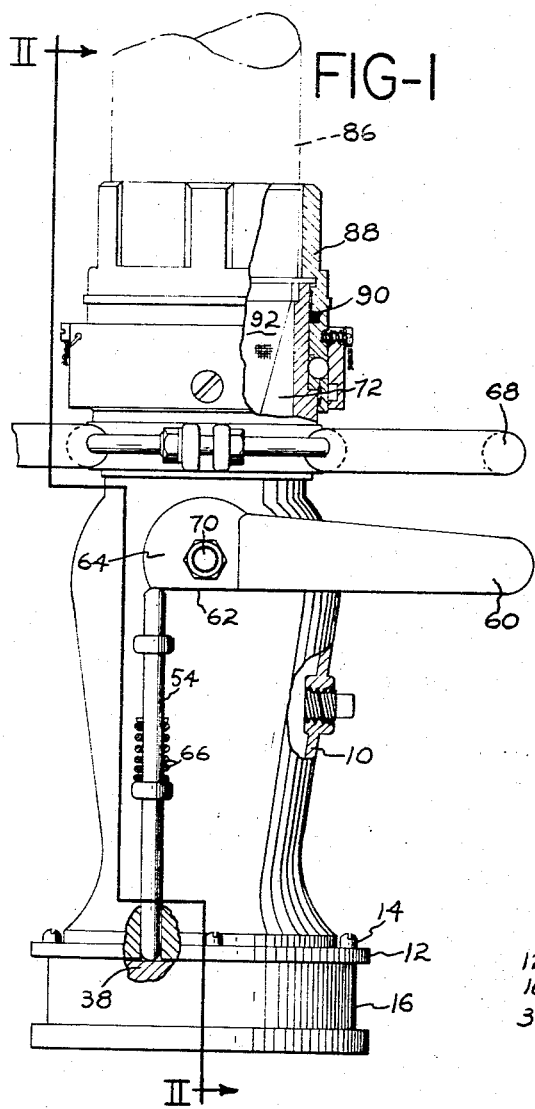
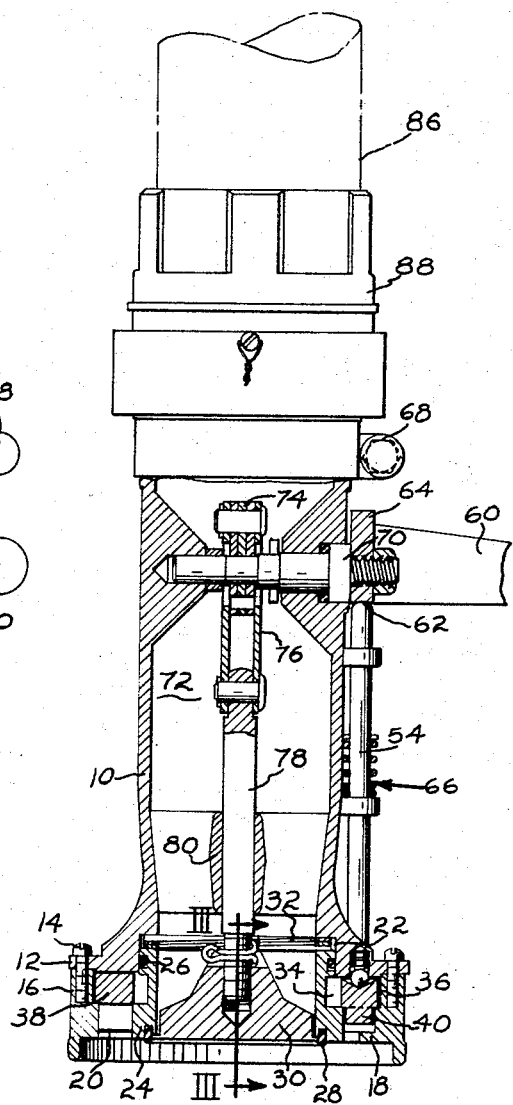
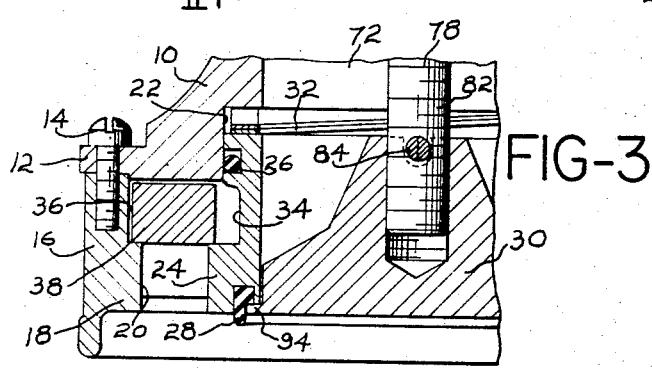
INVENTOR.
LESTER P. ROSELL
BY Toulmin & Toulmin
ATTORNEYS July 11, 1967 L. P. ROSELL 3,330,313
SUPPLY AND RECEIVER COUPLER
Filed Feb. 25, 1965 2 Sheets-Sheet 2

INVENTOR.
LESTER P. ROSELL
BY Toulmin & Toulmin
ATTORNEYS

United States Patent Office 3,330,313
Patented July 11, 1967

3,330,313
SUPPLY AND RECEIVER COUPLER
Lester P. Rosell, Dayton, Ohio, assignor, by mesne assignments, to Emco Wheaton, Inc., Dayton, Ohio
Filed Feb. 25, 1965, Ser. No. 435,145
7 Claims. (Cl. 141—384)

This invention relates to a coupler such as is employed for coupling a hose to the receiver fitting of a tank. For example, in the fueling of airplane tanks a coupler is employed on the end of the fuel line hose for sealingly connecting the hose to the fueling opening of the fuel tank of the plane. Many industrial uses for such couplers also exist.

In connection with the conventional couplers employed for fueling aircraft, the coupler structure is relatively complex and expensive and heavy and generally utilizes two telescopically arranged sleeves. The coupler is arranged so that it can be fitted to the tank fitting and latched thereto, and thereafter the valve member of he coupler is opened which automatically simultaneously opens a valve member in the filling fitting of the tank.

While couplers of the nature referred to are satisfactory, they are nevertheless as mentioned, complex, heavy and expensive and the need has long existed for a simpler type coupling arrangement for use in industrial installations and the like. The present invention is particularly concerned with a coupler of this type which is relatively small, compact and inexpensive, and which is relatively light with reference to couplers according to the prior art and which is relatively easy to manipulate. The present invention also proposes a simple coupler in which external rotating sleeves are eliminated, but which nevertheless embodies all of the important features of the larger more complex couplers including an interlock between the valve member actuating mechanism and the means connecting the coupler with the tank filling fitting.

The present invention still further proposes an improved detent structure pertaining to an interlock plate or ring forming a part of the coupler structure and which cooperates with the filling fitting of the tank in controlling the interlock mechanism referred to above.

The exact nature of the present invention will be more clearly understood upon reference to the following specification taken in connection with the accompanying drawings, in which:

FIGURE 1 is a side view of a coupler according to the present invention;

FIGURE 2 is a sectional view through the coupler indicated by line II—II on FIGURE 1;

FIGURE 3 is a fragmentary view drawn at enlarged scale showing a floating seal ring in the discharge end of the coupler;

Figure 4:
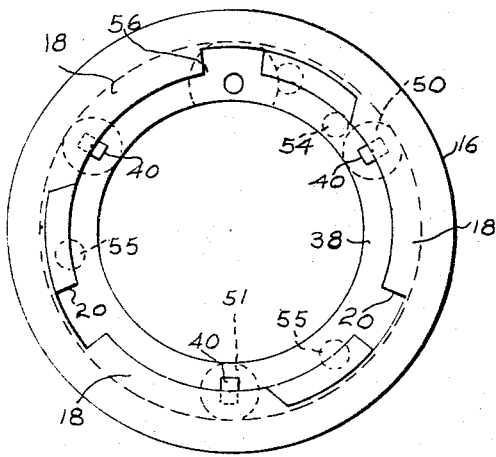
FIGURE 4 is a view looking in at the discharge end of the coupler showing the position of the interlock plate therein.

Referring to the drawings somewhat more in detail, the coupler according to the present invention comprises a body 10, preferably a cast member. Body 10 at its discharge end has an integral radial flange 12 and secured to flange 12 by screws 14 is a lug ring 16. Lug ring 16 has internally extending flange means 18 notched out as at 20 (see FIGURE 4), for receiving lugs on the filling fitting of a tank, said filling fitting not being shown but being substantially conventional.

The discharge end of body 10 is also provided with a cylindrically bored region 22 which receives one end of a nose piece 24. Nose piece 24 carries a sealing ring 26 which sealingly engages the periphery of cylindrically bored portion 22, and furthermore carries a sealing ring 28 in its outer end for sealing engagement with a poppet valve member 30.

A pair of wave washers or other suitable spring means 32 disposed between the bottom wall of cylindrically bored portion 22 and the inner end of nose piece 24 urges the nose piece in the outward direction toward poppet valve member 30.

Nose piece 24 has an annular groove 34 therein between the inner end and the outer end, and the said outer end has a somewhat larger diameter than the said inner end. The larger diameter outer end, in cooperation with groove 34 and also in cooperation with the annular groove 36 inside lug ring 16 provides a space for receiving interlock plate or ring 38. Interlock plate 38 is rotatable in the aforesaid space provided therefor and includes lock means 40 (see FIGURE 4) for engagement with notches formed in the ends of the tank filling fitting. Thus, when the coupler is placed on a tank filling fitting and interlock plate 38 is in the proper position, lugs on the filling fitting will enter notches 20 in lug ring 16 while the lugs 40 of interlock plate 38 will simultaneously enter matching notches in the filling fitting. Rotation of the coupler will then carry the lugs of the filling fitting around the flange 18 of the lug ring thereby to couple the coupler to the filling fitting while simultaneously the interlock plate is held to the filling fitting and rotates relative to the coupler body.

Figure 5:
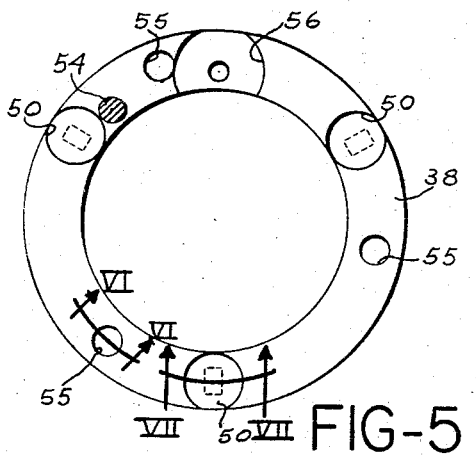
FIGURE 5 is a plan view of the interlock plate looking out towards the discharge end.
Figure 6:
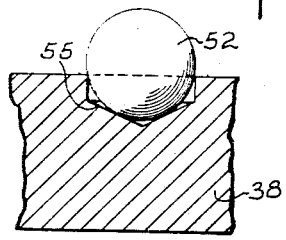
FIGURE 6 is a sectional view taken along the line designated 6—6 of FIG. 5.
Figure 7:
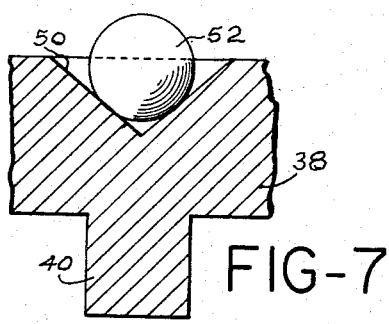
FIGURE 7 is a sectional view taken along the line designated 7—7 of FIG. 5.

The interlock plate 38 is provided with recesses 50 in circumferentially spaced relation and adapted for receiving spring pressed balls 52 which are housed in appropriate bores 51 in the valve body 10. The interlock plate 38 is also provided with recesses 55 which are in circumferentially spaced relation thereon as shown in FIGURE 5. FIGURE 6 indicates that the recesses 55 have sides which are perpendicular making it more difficult for a ball 52 to be removed from a recess 55 than from a recess 50.

The balls 52 drop into the recesses 50 when the interlock plate 38 is in the interlocked position. This arrangement prevents the interlock plate 38 from accidentally turning when the coupler is disconnected from the filling fitting. The balls 52 drop into the recesses 55 when the interlock plate 38 is in the "coupled on" position. At this time, the interlock plunger 54 which is reciprocally mounted on the valve body 10 will come into registration with countersing 56 permitting lever 60 to be rotated to open the valve 30. This arrangement prevents the interlock plate 38 from accidentally turning while the coupler is fully coupled to the filling fitting.

When plunger 54 registers with countersink 56, lever 60 can be rotated. Before plunger 54 was aligned with countersink 56, the upper end of the plunger engaged the flat 62 on the cam-like member 64 fixed to lever 60 and thereby prevented movement of the lever. When the plunger 54 is aligned with countersink 56, and lever 60 is operated, plunger 54 will be pushed downwardly into countersink 56 and will thereby lock the interlock plate 38 against rotation so that the coupler cannot be disconnected from the tank filling fitting except when lever 60 is in its FIGURE 1 position, and in which position poppet valve member 30 is closed. A spring 66 biases plunger 54 out of countersink 56 so that whenever the lever 60 is moved to its FIGURE 1 position, the body of the coupler can be rotated as by availing of handle means 68 secured thereto.

With reference to lever 60, lever 60 and cam-like member 64 are fixedly mounted on the end of a shaft 70 extending transversely into the valve body and extending across flow passage 72 of the valve body. Within the flow passage shaft 70 has fixed thereto an arm 74 connected by links 76 with the end of valve stem 78 which is reciprocally guided by spider means 80 in the coupler body. The outer end of stem 78 is threaded as at 82 and threadedly receives valve poppet member 30. A cotter pin 84 fixes the poppet valve member in any adjusted position on stem 78.

Flow passage 72 at the end of the coupler body opposite the discharge end communicates with a supply hose 86 which is threaded by a suitable fitting into rotatable coupler assembly 88 sealed to the coupler body by seal means 90 and within which coupler assembly retains in the inlet end of flow passage 72 the strainer screen 92.

A feature of the present invention is illustrated in FIGURE 3 which shows that poppet valve member 30 has a peripheral flange 94 that engages a resilient seal ring 28 which is mounted in the end of nose piece 24. The flange 94 of poppet valve member 30 also engages the end of nose piece 24 inwardly of seal 28 so that it has firm bearing on the end of the nose piece while still being in sealed engagement with seal ring 28 not only about the periphery of the flange 94 but also in the side thereof facing inwardly of the valve member.

The wave washers 32 assist in maintaining this sealing engagement, and when the poppet valve member 30 is moved outwardly by operation of lever 60, the wave washers will insure good sealing engagement of seal ring 28 with a surface provided for that purpose on the end of the filling fitting of the tank.

FIGURE 4 shows a view looking in at the discharge end of the coupler and shows the interlock plate 38 positioned therein and FIGURE 5 shows the placement of the recesses 50 and 55 and the countersink 56 thereon.

As seen in FIGURE 6 the recess 55 has perpendicular sides which make it more difficult for the spring loaded ball 52 to be removed therefrom than from the recess 50 which has the tapered sides. This construction makes it difficult for the coupler to be accidentally moved when in the "coupled on" position which prevents the hose 86 when twisted in use from turning the coupler when the coupler is in the "coupled on" position.

Figure 8:
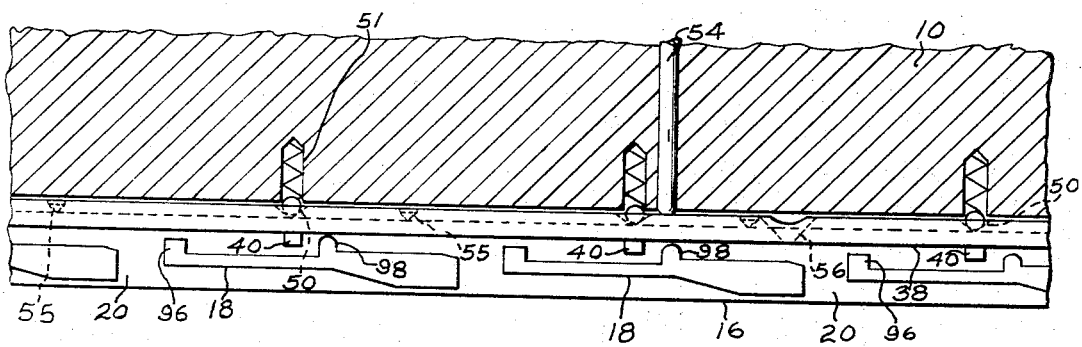
FIGURE 8 shows a plan view of the lug ring, interlock plate, and a portion of the valve housing as developed into a plane.

FIGURE 8 is a developed view of the lug ring 16, interlock plate 38, and a portion of the body 10 looking outwardly from the axis of the valve member 30.

The flange means 18 are provided with notches 20 in which the lugs of the filling fitting (not shown) are inserted. The filling fitting is also provided with circumferentially spaced notches which receive lugs 40 and thereby hold the interlock plate 38 in fixed position relative to the filling fitting. The coupler is then rotated and the spring loaded balls 50 are moved out of recess 50 and drop into recesses 55 when the coupler body is rotated in the direction A shown with the interlock plate 38 being held stationary.

The flange means 18 is provided with abutment stops 96 and 98 which limit the extent of rotation of the coupler body on the filling fitting. When uncoupling, the stops 96 will engage the lugs on the filling fitting when the coupler is aligned for removal.

It will be understood that this invention is susceptible to modification in order to adapt it to different usages and conditions; and accordingly, it is desired to comprehend such modifications within this invention as may fall within the scope of the appended claims.

I claim:

1. In a coupler; a body having a flow passage therethrough, means for connecting a supply hose to the inlet of said passage, a valve member sealingly mounted in the outlet end of said passage, lever means for moving said valve member to open and closed positions, means at said outlet end for detachably securing said coupler to a tank filling fitting and comprising, interlock plate means rotatably mounted in said outlet end for movement relative to said body to first and second positions, said interlock plate means having lugs thereon to cooperate with notches on a filling fitting to prevent rotation of said interlock plate means relative to said fitting when the coupler is attached thereto, said housing having circumferentially spaced bores therein between said body and said interlock plate means, balls in said bores and springs in said bores urging said balls into contact with said interlock plate means, said interlock plate means having first and second groups of circumferentially spaced recesses and a countersink on the side thereof facing said balls, said first group of recesses having conically shaped sides and positioned on said interlock plate means to releasably retain said balls when said interlock plate means is in said first position and said valve member is in said closed position, said second group of recesses having substantially vertical sides and positioned on said interlock plate means to releasably retain said balls when said interlock plate means is in said second position, a rod reciprocally mounted on said body having one end engaging said interlock plate means and the other end engaging said lever means, said countersink being positioned on said interlock plate means to be in alignment with said rod when said interlock plate means is in said second position permitting said one end of said rod to enter said countersink thereby permitting said lever means to be actuated to open said valve member and also preventing rotation of said interlock plate means to said first position until said valve member is closed.

2. In a coupled; a generally cylindrical body having handle means thereon for rotation of the body, said body having an axial flow passage therethrough, rotatable means on the inlet end of the body for swivelly connecting a supply hose to the inlet end of said body, a sleeve-like nose piece sealingly mounted in the body in the outlet end thereof and spring means biasing said nose piece in the axially outward direction in said body, a poppet valve member at the outer end of said nose piece, linkage means in the body connected to said valve member for moving it toward the outer end of said piece into sealing flow preventing relation thereto or away from said nose piece into spaced flow permitting relation thereto, a lever pivoted on the body and connected to said linkage for actuation thereof, a rotatable interlock plate rotatably mounted in the body at the discharge end thereof and surrounding said nose piece, an interlock plunger on the body extending between the interlock plate and the lever and axially movable on said body, said lever having a cam portion thereon engageable by the adjacent end of said plunger to prevent movement of the lever when the plunger is in the axial position occupied thereby when the other end thereof engages said interlock plate in a first rotated position of the interlock plate in said body, said interlock plate having a recess therein which aligns with the plunger in a second rotated position of the interlock plate in said body and which recess will permit axial movement of the plunger to unlock the lever while simultaneously locking said interlock plate, means on the interlock plate engageable with a filling fitting to which the coupling is to be coupled for holding the interlock plate against rotation while said body is rotated to couple it to the fitting while simultaneously turning said interlock plate to its said second rotated position in said body, detent means acting between said body and said interlock plate operable for releasably detaining said interlock plate in each of its said rotated positions in said body, said cam on said lever preventing axial movement of said plunger to remove said other end thereof from said recess except in the closed position of said lever, and a spring biasing said plunger toward its lever locking position.

3. A coupler according to claim 2 in which said body has a lug ring detachably secured to the outlet end of said body engaging the outer end of said interlock plate and rotatably retaining it on said body, said lug ring including radial lug means for engagement with mating lug means on the filling fitting to couple the coupler to the fitting.

4. A coupler according to claim 3 in which said detent means comprises conical recesses in the interlock plate, bores in said body adjacent said interlock plate, balls in said bores, and springs in said bores urging said balls against said interlock plate.

5. A coupler according to claim 4 in which the spring means biasing said nose piece is in the form of wave washers disposed between the inner end of said nose piece and said body.

6. A coupler according to claim 5 in which said nose piece includes a groove in its axially outer end face, and a seal ring in said groove, said valve member having a peripheral flange engageable with the outer end of said nose piece and with said seal ring.

7. A coupler according to claim 6 in which said linkage includes a rod slidably guided in said body and screw threadedly connected to said valve member to permit adjustment of said valve member relative to said nose piece and also to permit removal of said valve member to, in turn, permit said nose piece to be removed from said body.

References Cited
UNITED STATES PATENTS

| | | | |
|---|---|---|---|
| 2,065,019 | 12/1936 | Pedersen | 141—346 X |
| 2,679,407 | 5/1954 | Badger | 137—614.06 X |
| 2,680,030 | 6/1954 | Hoelzer. | |
| 2,729,471 | 1/1956 | Fraser. | |
| 3,034,544 | 5/1962 | Griswold | 141—346 |
| 3,045,721 | 7/1962 | Shepherd et al. | 141—346 |

LAVERNE D. GEIGER, *Primary Examiner.*

H. S. BELL, *Assistant Examiner.*